July 17, 1951 W. D. LEWIS 2,561,212

MICROWAVE HYBRID BRANCHING SYSTEMS

Filed Dec. 15, 1949 2 Sheets-Sheet 1

INVENTOR
W. D. LEWIS
BY N. S. Ewing
ATTORNEY

July 17, 1951 W. D. LEWIS 2,561,212

MICROWAVE HYBRID BRANCHING SYSTEMS

Filed Dec. 15, 1949 2 Sheets-Sheet 2

INVENTOR
W. D. LEWIS
BY
N. S. Ewing
ATTORNEY

Patented July 17, 1951 2,561,212

UNITED STATES PATENT OFFICE 2,561,212

MICROWAVE HYBRID BRANCHING SYSTEMS

Willard D. Lewis, Little Silver, N. J., assignor to Bell Telephone Laboratories, Incorporated, New York, N. Y., a corporation of New York Application December 15, 1949, Serial No. 133,195

6 Claims. (Cl. 250—15)

This invention relates to electric wave transmission systems and more particularly to multichannel high frequency repeater circuits for said systems. In general, the subject-matter of this invention is related to that of applicant's copending applications for patent, Serial No. 789,985, filed December 5, 1947, now Patent No. 2,510,288, issued June 6, 1950, and Serial No. 120,142, filed October 7, 1949, wherein specific methods and apparatus for segregating or branching a plurality of channels of multichannel high frequency, ultra-high frequency, or microwave energy in transmission lines and radio communication systems are shown and described.

A principal object of the present invention is to segregate, amplify and recombine a plurality of signals of multichannel high frequency, ultra-high frequency, or microwave energy.

It is another object of the invention to economize in the apparatus previously required to segregate and recombine a given number of signals.

It is a further object of the invention to provide circuit arrangements and configurations of the segregating and branching units disclosed in the above-mentioned copending applications, in which the required number of units is decreased by substantially one half of those previously required.

These and other objects are accomplished in the specific embodiments of the invention herein disclosed by simultaneously employing each side of each segregating or branching unit for separate and distinct functions. For example, in a repeater system in which a first plurality of frequency-spaced channels are to be used for transmitting in two directions and a secend plurality of interleaved frequency-spaced channels are to be used for receiving from two directions at a relay or repeater station, it has heretofore usually been necessary to employ a separate branching circuit for each receiving channel in each direction and a separate branching circuit for each transmitting channel in each direction. In other words, four channel branching circuit units were required at a repeater for every two-way intelligence signal to be amplified by the relay system. However, in one embodiment of the invention to be disclosed, each branching circuit is simultaneously employed, in a manner to be described, to segregate the microwave energy arriving in one channel from both directions, or to simultaneously combine microwave energy in one channel in both directions. Each circuit performs two distinct branching operations; thus, only one half the number of units formerly required is needed.

In a second embodiment of the invention particularly appropriate for use in a long distance wave-guide system or a radio relay system having duplexed antennas, and having a channel arrangement substantially similar to that of the system discussed above, branching circuit units are arranged in tandem in the transmission path. Again, each circuit serves the dual function of branching energy in one channel simultaneously for both directions of transmission. Such a system requires only two channel branching circuits at a repeater for every microwave channel to be transmitted in both directions by the relay system.

In another embodiment of the invention, each branching circuit segregates energy in one channel and simultaneously combines energy in said channel.

The nature of the present invention and its various objects, features, and advantages will appear more fully on consideration of the embodiments illustrated in the accompanying drawings and hereinafter to be described.

Figure 1:
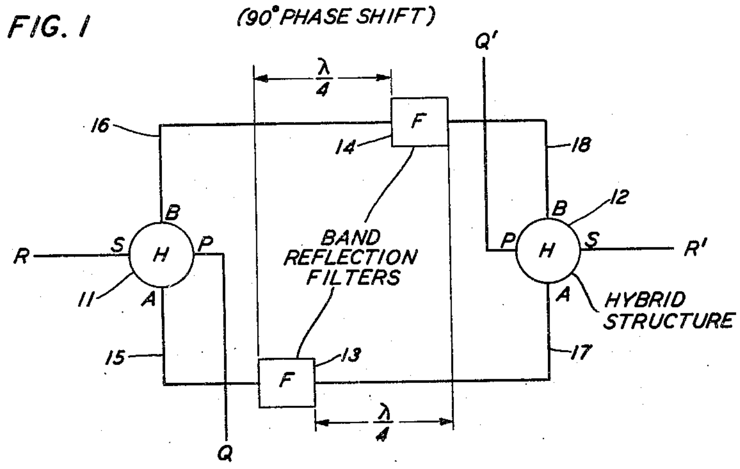
Fig. 1 illustrates schematically a basic hybrid branching circuit of the type employed by the invention.

Referring to Fig. 1, a basic hybrid branching circuit unit is shown. The general function of this unit is to segregate or branch microwave energy components in a particular chosen frequency band from the energy components outside that band. The particular embodiment of the branching circuit represented by the schematic of Fig. 1 has been disclosed in detail in the above-mentioned copending application, Serial No. 789,985, filed December 5, 1947, now Patent No. 2,510,288, issued June 6, 1950, and in an article entitled "A non-reflecting branching filter for microwaves" in the Bell System Technical Journal, vol. 27, January 1948, pages 83 to 95. As disclosed therein, the branching circuit comprises a pair of microwave hybrid junctions 11 and 12, each having two pairs of conjugately related arms A, B, and P, S. Hybrid junctions 11 and 12 are arranged with the arms A and B connected to transmission lines 15 and 16, respectively, with transmission line 16 longer by substantially one-quarter wavelength of the median frequency of the band frequency or channel to be segregated or branched than line 15. Identical band or channel reflection filters 13 and 14 are designed to reflect the frequency of the channel to be segregated and to pass freely all energy not in the reflected band.

Hybrid junctions 11 and 12 may be structures of the so-called wave-guide junction or wave-guide coaxial or other transmission line loop structures of the types illustrated and described, for example, in the United States Patent 2,445,985, granted July 27, 1948, to W. A. Tyrrell, and described in the Proceedings of the Institute of Radio Engineers, vol. 35, November 1947, pages 1294 to 1306, or of the type illustrated and described with reference to Figs. 4, 5 and 6 in applicant's copending application Serial No. 789,985, filed December 5, 1947, now Patent No. 2,510,288, issued June 6, 1950.

Whatever form of hybrid structure is employed, it should have four arms, associated in two pairs, each arm of a pair being conjugately related to the other arm of the same pair. For convenience here, the notation adopted in applicants above-mentioned application will be employed throughout the following description of hybrid junctions in which the first pair will be designated P and S, respectively, and arms of the second pair will be designated A and B, respectively. The inherent properties of hybrid junctions are well known in which wave energy introduced into the structure from or by way of either arm of the first pair will produce no energy leaving the structure by way of the other arm of that pair, but the energy introduced will divide equally between the other pair of arms A and B of the hybrid structure.

Further, the waves representing the halves of the energy in each of the second pair of arms A and B will be in phase if the energy is introduced by arm P of the first pair, or 180 degrees out of phase if it is introduced by way of arm S of the first pair.

Conversely, if equal wave energies are introduced in phase into the hybrid junction by way of the two arms A and B of the second pair, they will combine in arm P of the first pair, no wave energy being transmitted to arm S.

If equal wave energies 180 degrees out of phase are introduced into the microwave hybrid junction by way of the two arms A and B of the second pair, the wave energies will combine in arm S of the first pair, no wave energy being transmitted to arm P. Any multiple of 360 degrees phase difference can be added to the in-phase or out-of-phase conditions just described without affecting the arm in which the energies, applied to arms A and B, will combine. When equal energies are introduced into the A and B arms, changing the phase of the energy introduced into one only of the A and B arms by 180 degrees will cause the combined energy to appear in the opposite one of the arms P or S, in which it would have appeared without such a change. As applied to the circuit of Fig. 1, this means that the wave energy entering arm S of hybrid structure 11 by transmission line R will devide equally at all frequencies between transmission lines 15 and 16, the two portions leaving hybrid arms A and B being 180 degrees out of phase with respect to each other.

If an energy wave comprising a plurality of channels, the frequency of one of which is within the reflection range of filters 13 and 14, is applied to transmission line R, that one will divide in this manner into arms A and B. The components of the wave travel along lines 15 and 16 to the reflection filters 13 and 14. At the filters, frequency components within the band of reflection of the filter will be reflected back down lines 15 and 16, while energy outside of the reflection band will pass through filters 13 and 14 to transmission lines 17 and 18, respectively. The reflected frequencies, above described, will return to hybrid structure 11 with equal amounts of wave energy being reflected back through the transmission lines 15 and 16.

However, the reflected wave energies in the two lines will be an additional 180 degrees out of phase with respect to their original phase relation when first leaving hybrid structure 11, since the waves traversing the line 16 have twice traversed a path one-quarter wavelength longer than the path traversed by the waves reflected back through line 15.

From the inherent properties of hybrid structures, the reflected waves will not appear in input transmission line R but will combine in output transmission line Q, which is connected to arm P of hybrid structure 11.

The half energy portions of the waves having frequency components outside of the band reflection will pass freely through filters 13 and 14, and then through transmission lines 17 and 18, respectively, to the output hybrid structure 12. Transmission lines 17 and 18 are identical except that line 17 is substantially one-quarter wavelength of the median frequency of channels, longer than line 18. These two components of energy will arrive at hybrid 12 without change in their relative phase relations since identical filters 13 and 14 have the same electrical length, in which event they will combine and pass out arm S of hybrid 12 to which transmission line R′ is connected.

Similarly, if a wave comprising a plurality of channels is applied to arm P of hybrid 11, energy within the reflected channel will combine in arm S of hybrid 11 and appear in line R. All other frequency components outside the reflection band will combine in arm P of hybrid 12 and appear in line Q′.

Since the schematic of the branching filter configuration is symmetrical, the general properties of the circuit may be briefly summarized in view of the above-described operation. Therefore, let each of the lines connected to the four arms R, Q, Q′, and R′ of the circuit be terminated in a characteristic impedance looking away from the circuit. Under these conditions, the characteristic impedance will be seen looking toward the circuit in any one of the lines. When a wave having frequency components within the reflection band of the filters and frequency components outside the band of the filters is applied to the branching circuit by means of any line or lines, line R will effectively be connected to line R′ and line Q to line Q′ for the frequency components passed by the filters. Line R will be effectively connected to line Q and line R′ to line Q′ for all the frequency components reflected by the filters. Line R will always be balanced from or conjugate to line Q′ and line R′ from line Q.

Numerous physical embodiments of high frequency or microwave components may be designed having these characteristics. For example, one particularly advantageous embodiment is shown in applicant's application Serial No. 789,985, now Patent No. 2,510,288, issued June 6, 1950, in Fig. 9. Other embodiments which make use of the pseudohybrid junction are shown in applicant's application Serial No. 120,142, in Figs. 16, 17, and 19. Each of these embodiments and others which may readily be designed by one skilled in the art are represented in their general electrical qualities by the equivalent circuit shown herein in Fig. 1. For this reason, this circuit will be used throughout the present application to represent a unit branching or segregating circuit. However, if band-pass filters were used in the branching circuit of Fig. 1 rather than band reflection filters as described, it would be necessary only to interchange the R connection with the Q connection on Fig. 1 to obtain the same operation. This similarity and difference between the band reflection branching circuit and the band-pass branching circuit is fully treated in the above-mentioned applications for patents and publications.

Each of these types of hybrid branching units may be further described as a circuit having four wave-guide terminals arranged in two pairs. For example, in Fig. 1, R and Q comprise one pair and Q' and R' comprise a second pair. The terminals of each pair are effectively exclusively connected together for signal frequencies within a given frequency band. The corresponding terminals of the two pairs are effectively exclusively connected together for signal frequencies outside the given frequency band. For example, in Fig. 1, terminal R corresponds to terminal R', and terminal Q corresponds to terminal Q'. These corresponding terminals are effectively connected together for frequencies not within the reflection band of filters 13 and 14.

In each of the following embodiments to be described, a plurality of such hybrid branching circuits are combined in various configurations in order to accomplish the objects of the invention. Within the realizable discrimination characteristics of the filter units, the conduction paths through the branching units are separate and exclusive. The conduction path between the terminals of one pair are isolated by the filters from the conduction path between the terminals of the other pair. Each conduction path may carry a separate intelligence bearing signal. Likewise, one conduction path between the corresponding terminals of different pairs is isolated from the other path between corresponding terminals of the pairs by virtue of the inherent properties of the hybrid junctions and may also each carry separate intelligence bearing signals. These properties will become more apparent in connection with the specific embodiments now to be described.

Figure 2:
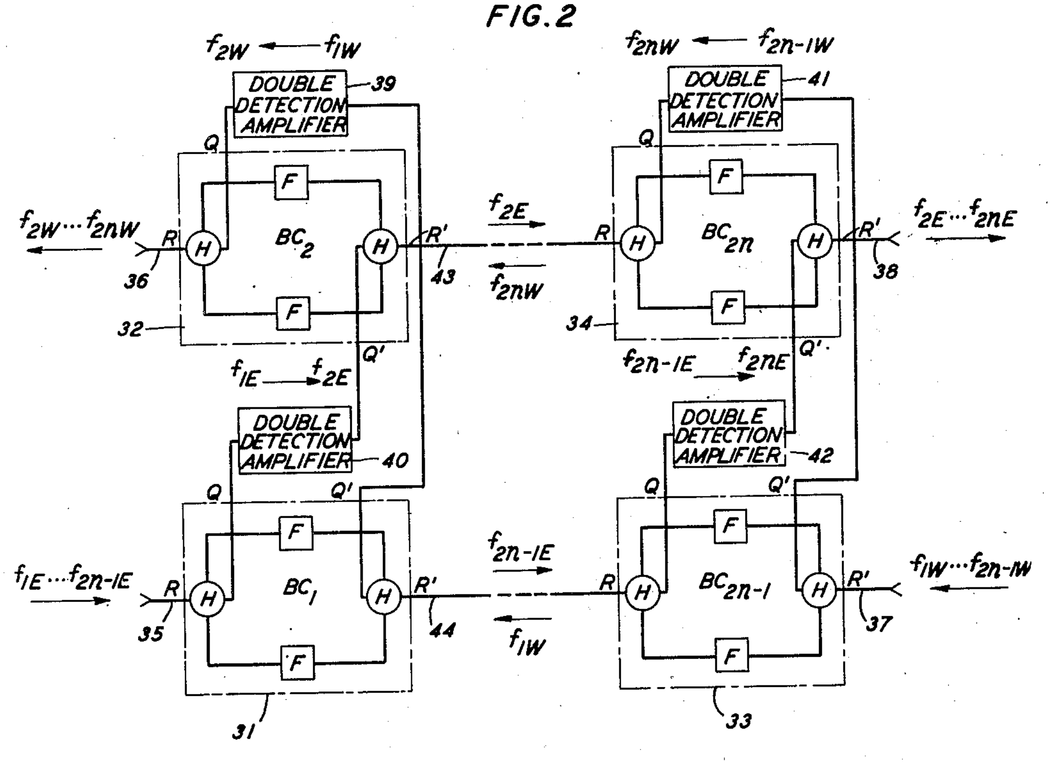
Fig. 2 illustrates schematically a microwave repeater system of the type employing separate transmitting and receiving antennas.

Consider therefore Fig. 2, which shows a repeater suitable for use in a multichannel two-way transmission system operating with a plurality of frequency-spaced channels 1 through 2$n$. In a typical microwave transmission system each of the channels may have a band width of as much as several hundred megacycles. The center frequency of each channel is frequency spaced from the next adjacent frequency channel by at least the band width of each channel. In many cases it will be desirable to leave some margin of separation between the channels in which case the frequency spacing between the center frequencies of each channel will be somewhat greater than the band width of each channel. The intelligence bearing signals to be amplified and transmitted in each channel comprise a band of signal sidebands produced by modulating a carrier signal of frequency approximating the mid-band frequency of the channel with the intelligence signal by any of the well-known methods of modulation. The intelligence bearing signals may or may not include the carrier frequency depending on the particular type of modulation employed. In any event, it will be convenient in the following discussion to designate the intelligence bearing signals in each channel by the frequency of the mid-band component or carrier frequency. For example, the signal transmitted in channel 1 may be called energy components $f_1$ and the signal transmitted in channel 2$n$ may be called energy components $f_{2n}$. Alternate numbered channels are used for receiving in each direction at the repeater and the interleaved channels are used for transmitting in each direction for the repeater. For example, the odd-numbered channels are shown for receiving and the even-numbered channels for transmitting.

Such a system arrangement utilizing the same frequencies incoming from both directions and the same frequencies outgoing in both directions substantially reduces the danger from crosstalk since high and low level signals at the same frequency do not occur anywhere in the repeater. In other words, since the odd-numbered incoming low level signals are amplified and translated to even-numbered high level signals, there is no opportunity for feedback or crosstalk from the repeater output to the repeater input.

The circuit comprises one branching unit filter of the type shown in Fig. 1 for each frequency channel of the system. For example 31 represents a branching circuit adapted to segregate components $f_1$ in channel 1. Likewise, 32, 33 and 34 represent branching circuits adapted to segregate the frequency components $f_2$, $f_{2n-1}$ and $f_{2n}$ in channels 2, 2$n$—1, and 2$n$ respectively. The R' connection of the second pair of unit 32 is connected to the R connection of the first pair of unit 34 by transmission line 43, and the R' connection of the second pair of unit 31 is connected to the R connection of the first pair of unit 33 by line 44. Double-detection amplifiers 39 and 40 are suitably arranged to amplify energy appearing in channel 1 and to translate the frequency thereof to that of channel 2. Amplifier 39 is connected from the Q' terminal of unit 31, the terminal corresponding to Q of the first pair, to the Q terminal of unit 32, and amplifier 40 is connected from the Q terminal of unit 31 to the Q' terminal of unit 32. Similar double-detection amplifier units 41 and 42 are adapted to amplify the energy components of channel 2$n$—1 and to translate the frequency thereof to the frequency of channel 2$n$. Amplifier 41 is connected from terminal Q' of unit 33 to terminal Q of unit 34, and amplifier 42 is connected from terminal Q of unit 33 to terminal Q' of unit 34.

Similar configurations comprising a pair of channel branching circuits and a pair of double-detection amplifiers may be inserted in lines 43 and 44 for all other channels between channel 1 and channel 2$n$.

Amplifiers 39, 40, 41 and 42 may each be any of the amplifier circuits used in present microwave carrier transmission systems of the types which amplify the intelligence bearing signals and translate the carrier frequency thereof a given amount for retransmission. One of the more common types of these circuits is known as the double-detection amplifier since the frequency of the incoming carrier is first reduced to a lower intermediate frequency for amplification and then raised again by a second heterodyne operation to the new translated carrier frequency. Many advantages are inherent in such a circuit and for that reason the amplifiers 39 through 42 are indicated as double-detection amplifiers.

The exact operation of the circuit of Fig. 2 may more readily be understood by tracing the path of the signal through the repeater. For this purpose signal energy in the first channel for transmission to the east is designated as $f_{1E}$ and signal energy in the first channel for transmission to the west is designated as $f_{1W}$. Similar respective designations are applied to the other channels. The total high frequency signal comprising components $f_{1E}$ to $f_{2n-1E}$ is received by antenna 35 and applied to the R terminal of a branching circuit 31. The components $f_{1E}$ are branched off into the Q terminal, while all other components are passed by branching circuit 31 out the R' terminal to transmission line 44 and thus to branching circuit 33. The components $f_{1E}$ in the Q terminal are passed to amplifier 40 where they are amplified and the frequency translated from $f_1$ to $f_2$. The translated frequency components $f_{2E}$ are applied to branching circuit 32, which it will be recalled is effective for the frequency of channel 2, by means of the Q' terminal where they are reflected into the R' terminal. Thus they pass to transmission line 43 and the R terminal of branching circuit 34. Since components $f_{2E}$ are not within the reflection range of branching circuit 34, which is effective only for the frequency of channel $2n$, they are passed therethrough and out of terminal R' to transmitting antenna 38 to be sent on in channel 2 toward the east. Similarly, components $f_{2n-1E}$ are branched by circuit 33, amplified and translated to $f_{2n}$ by amplifier 42, and reflected to the east in channel $2n$ by branching circuit 34.

The total high frequency signal comprising components $f_{1W}$ to $f_{2n-1W}$ for transmission to the west is received by antenna 37 and applied to the R' terminal of branching circuit 33. The components $f_{2n-1W}$ are branched into the Q' terminal of circuit 33 and applied to double-detection amplifier 41. Amplifier 41 amplifies the signal energy and translates the frequency thereof to $f_{2n}$. The translated components $f_{2nW}$ are applied to terminal Q of branching circuit 34, reflected by way of the R terminal and to transmission line 43, and thus through branching circuit 32 to antenna 36 for transmission in the west direction. In similar fashion all remaining west transmission channels are branched off, amplified and retransmitted by antenna 36.

In such an arrangement of branching circuit units, one branching circuit simultaneously branches the two portions of microwave energy in a given channel arriving at the repeater from both the east and the west, or one branching circuit reflects two portions of energy in one channel simultaneously to the east and to the west. In either case each branching circuit unit performs its function in two distinct intelligence-bearing systems. For example, branching circuit 31 separates the components $f_{1E}$ from all other components arriving at the repeater from the west, and at the same time, branching circuit 31 separates the components $f_{1W}$ from all other components arriving at the repeater from the east. Each side of the reflecting filter unit is simultaneously employed. The side toward the first pair of terminals R and Q branches signals for transmission to the east, and the side toward the second pair of terminals R' and Q' branches signals for transmission to the west. Likewise, one side of the filters of branching circuit 32 reflects the components of $f_{2W}$ toward terminal R for transmission toward the west, and simultaneously the other side reflects the components $f_{2E}$ toward terminal R' for transmission toward the east.

In certain applications it may be desirable to use only a portion of the circuit shown in Fig. 2. For example, the transmitting branching circuits 32 and 34 may be used alone to transmit signal channels in two directions, or receiving branching circuits 31 and 33 may be used alone to receive signal channels from two directions without conjunction with the transmitting pair.

Figure 3:
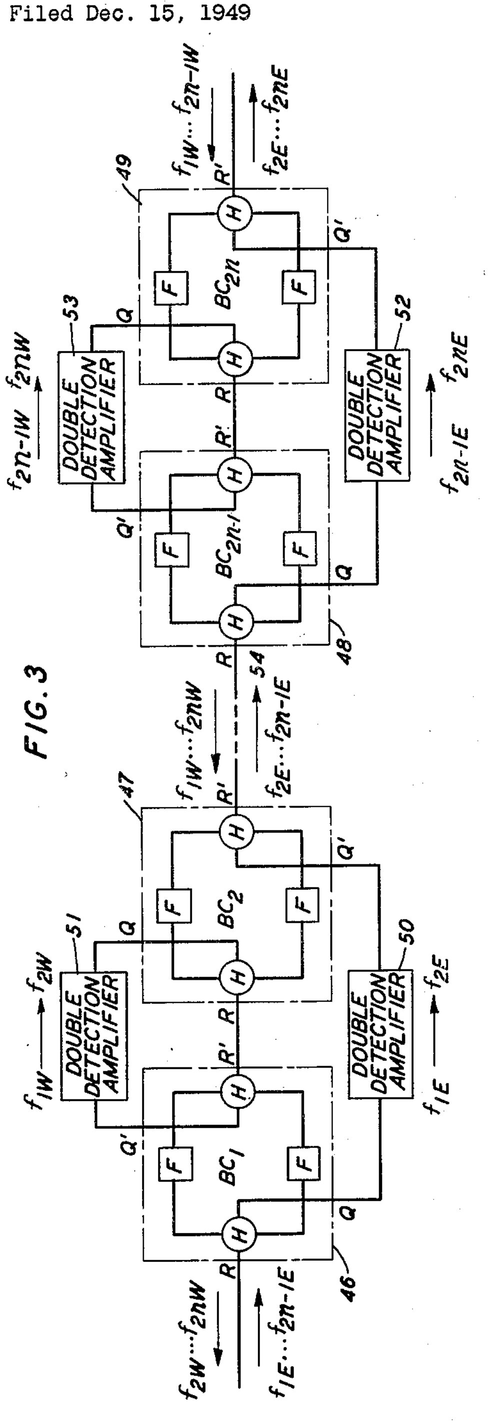
Fig. 3 illustrates schematically a microwave repeater for a wave-guide system having a single transmission medium, or for a radio system employing duplexed antennas.

Fig. 3 shows a repeater for use in a wave-guide system or a radio system using duplex antennas. In such a system the filter units are serially connected in the transmission medium. The channel arrangement and designation are the same as in Fig. 2.

Hybrid branching circuit units 46 through 49, effective for the frequencies of channels 1 through $2n$, respectively, are serially connected by means of their corresponding terminals R and R' in the path of the multichannel signal to be amplified.

Double-detection amplifiers 50 and 51 are suitably arranged to amplify energy appearing in channel 1 and to translate the frequency thereof to that of channel 2. Amplifier 50 is connected from the Q terminal of unit 46 to the Q' terminal of unit 47, and amplifier 51 is connected from the Q' terminal of unit 46 to the Q terminal of unit 47. Similar double-detection amplifiers 52 and 53, adapted to amplify energy appearing in channel $2n-1$ and to translate the frequency thereof to that of channel $2n$, are connected between branching circuits 48 and 49.

The total high frequency signal comprising components $f_{1E}$ to $f_{2n-1E}$ is applied to the repeater from a duplexed antenna or a wave-guide system to terminal R of branching circuit 46. The components $f_{1E}$ are branched off by way of the Q terminal of branching circuit 46, since they lie within the reflection band of the unit, and are applied to amplifier 50 where they are amplified and translated to the frequency of channel 21. The translated components $f_{2E}$ are applied to the Q' terminal of branching circuit 47, where they are reflected toward the east by way of terminal R'. They will pass through the branching circuit units 48 and 49 since the frequency $f_2$ is outside the reflection band of the filters in the circuits. The remaining components $f_{2n-1E}$ are similarly branched, amplified and translated by branching circuits 48 and 49 and their associated amplifier 52.

Consider now the operation of the multichannel repeater for the total high frequency signal arriving at the repeater for transmission to the west. The components $f_{1W}$ pass unhampered through branching circuits 49 and 48 to transmission line 54 since these components lie outside the reflection band of these branching circuits. Likewise, the components $f_{1W}$ are passed unhampered through branching circuit 47 which is effective only for the frequency of channel 2. The components $f_{1W}$ will, however, be branched off by branching circuit 46 by way of terminal Q' and passed to amplifier 51. Here the components are amplified, translated to the frequency of channel 2, and applied by way of terminal Q to branching circuit 47. Since translated components $f_{2W}$ now lie within the reflection band of branching circuit 47 they will be reflected out terminal R of circuit 47 to terminal R′ of circuit 46. These components, which are outside of the reflection band of branching circuit 46, will pass unhampered therethrough and out terminal R for transmission to the west.

The remaining channels comprising components $f_{2n-1W}$ are similarly branched, amplified, and retransmitted by branching circuits 48 and 49, respectively.

Like the arrangement of Fig. 2, each branching circuit unit performs its function in two distinct intelligence-bearing systems. For example, branching circuit 46 separates the components $f_{1E}$ from all other components arriving at the repeater from the west, and simultaneously separates the components $f_{1W}$ from all other components arriving at the repeater from the east. Each side of the reflecting filter unit is simultaneously employed. The side toward the first pair of terminals R and Q branches signals arriving from the west, and the side toward the second pair of terminals R′ and Q′ branches signals arriving at the repeater from the east. The branching circuit 47, the function of which is closely related to the transmitting operation, reflects the components $f_{2W}$ toward the west from one filter side and the components $f_{2E}$ toward the east from the other filter side.

Figure 4:
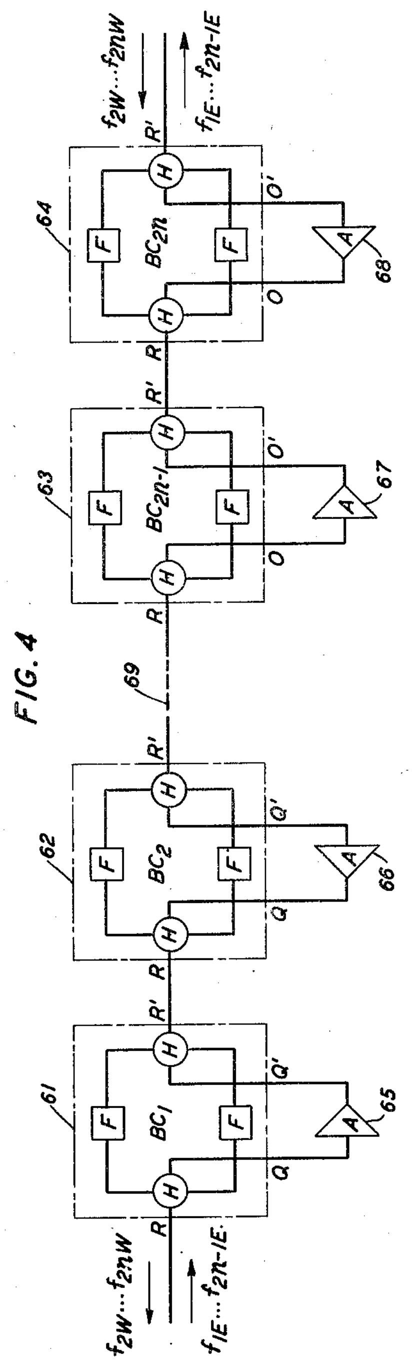
Fig. 4 illustrates schematically a straight-through amplification microwave repeater system.

Fig. 4 shows a repeater suitable for use in a multichannel transmission system in which straight-through amplification repeater technique is employed on each channel so that a received channel is amplified and transmitted on toward the next repeater at the same frequency. Odd-numbered channels are used for transmitting toward the east, and even-numbered channels are used for transmitting toward the west. The repeater comprises a plurality of hybrid branching circuit units 61 through 64, each effective uniquely for the frequency components of one channel, which are serially connected in the transmission medium by means of their R and R′ connections. Microwave amplifiers 65 through 68 are connected between the Q and Q′ terminals of each branching circuit.

The high frequency signal in channel 1 for transmission to the east, components $f_{1E}$, is branched off by way of the Q terminal of branching circuit 61 and applied to amplifier 65. Upon being amplified the signal components are reinserted into the transmission path by way of Q′ terminal of branching circuit 61. Thus the same branching circuit performs both the operation of segregating and the operation of combining one channel.

In like fashion, channels for transmission to the west are segregated, amplified and recombined by branching circuits 62 and 64 and their associated amplifiers 66 and 68, respectively.

In all cases it is to be understood that the above-described arrangements are illustrative of the principles of the invention. Numerous other arrangements may be devised by those skilled in the art without departing from the spirit and scope of the invention.

What is claimed is:

1. A multichannel repeater for microwave transmission systems of the types having a first frequency channel for receiving intelligence-bearing signals from two directions in a transmission medium at said repeater and a second frequency channel for transmitting intelligence-bearing signals in said two directions in said transmission medium from said repeater comprising in combination, at least a first and second hybrid branching circuit each having two pairs of wave-guide terminals, the terminals of each pair being effectively exclusively connected together for signal frequencies within a given frequency band and the corresponding terminals of the two pairs being effectively exclusively connected together for signal frequencies outside said band, the band frequency of said first branching circuit being substantially equal to the frequency of said first channel, the band frequency of said second branching circuit being substantially equal to the frequency of said second channel, one terminal of said first branching circuit connected to receive said intelligence-bearing signals from one direction, the corresponding terminal connected to receive said intelligence-bearing signals from the other direction, means for amplifying said intelligence-bearing signals and translating the frequency thereof from said first channel frequency to said second channel frequency, said means connected from the paired terminal of said one terminal of said first branching circuit to one terminal of said second branching circuit, and a second amplifying and translating means connected from the corresponding terminal of said paired terminal of said first branching circuit to the corresponding terminal of said one terminal of said second branching circuit.

2. A multichannel repeater for microwave transmission systems of the types having a first frequency channel for receiving intelligence-bearing signals from two directions in a transmission medium at said repeater and a second frequency channel for transmitting intelligence-bearing signals in said two directions in said transmission medium from said repeater comprising in combination at least a first and second hybrid branching circuit each having two pairs of wave-guide terminals, the terminals of each pair being effectively exclusively connected together for signal frequencies within a given frequency band and the corresponding terminals of the two pairs being effectively exclusively connected together for signal frequencies outside of said band, the frequency band of said first branching circuit being substantially equal to the frequency of said first channel, the frequency band of said second branching circuit being substantially equal to the frequency band of said second channel, a wave-guide connection between one terminal of one pair of said first branching circuit and one terminal of one pair of said second branching circuit, means for amplifying intelligence-bearing signals and translating the frequency thereof from said first channel frequency to said second channel frequency connected from the other terminal of said one pair of said first branching circuit to the other terminal of said one pair of said second branching circuit, means for applying microwave energy in said transmission medium to the terminal of the other pair of said second branching circuit corresponding with said one terminal, and means for applying microwave energy from the terminal of the other pair of said first branching circuit corresponding with said one terminal to said transmission medium .

3. The combination according to claim 2 including means for amplifying said intelligence-bearing signals and translating the frequency thereof from said first channel frequency to said second channel frequency connected from the remaining terminal of said other pair of said first branching circuit to the remaining terminal of said other pair of said second branching circuit.

4. A microwave signal transmission system for simultaneously transmitting a first plurality of signal channels in a first direction in a transmission medium and a second plurality of signal channels in a second direction in said transmission medium, each of said channels to be transmitted in said first direction having a band frequency corresponding respectively to one of said channels to be transmitted in said second direction, said transmission system comprising a plurality of microwave band reflection units connected in serial relation in said transmission medium, each of said reflection units having two pairs of wave-guide terminals, the terminals comprising a pair being effectively exclusively connected together by reflection of signal frequencies within one band, each of said reflection units effective uniquely for each of said channel frequency bands, corresponding terminals of the pairs of each one unit being exclusively connected together for signal frequencies outside said band, one corresponding terminal of each pair of each unit being included in said serial connection, an input means for each channel of said first plurality connected to one remaining terminal of said filter unit effective for the frequency of said channel whereby signal energy in said channel is reflected in said first direction, and an input means for each channel of said second plurality connected to the other remaining terminal of said filter unit whereby signal energy in said channel is reflected in said second direction.

5. A microwave signal transmission system for simultaneously transmitting a first plurality of signal channels in a first direction and a second plurality of signal channels in a second direction, each of said channels to be transmitted in said first direction having a frequency band corresponding respectively to one of said channels to be transmitted in said second direction, said transmission system comprising a pair of microwave antennas adapted to transmit signal energy in opposite directions, a plurality of microwave band reflection units connected in serial relation between said pair of antennas, each of said reflection units having two pairs of wave-guide terminals, the terminals comprising a pair being effectively exclusively connected together by reflection of signal frequencies within one band, each of said reflection units effective uniquely for each of said channel frequency bands, corresponding terminals of the pairs of each one unit being exclusively connected together for signal frequencies outside said band, one corresponding terminal of each pair of each unit being included in said serial connection, an input means for each channel of said first plurality connected to one remaining terminal of said filter unit effective for the frequency of said channel whereby signal energy in said channel is reflected in said first direction, and an input means for each channel of said second plurality connected to the other remaining terminal of said filter unit whereby signal energy in said channel is reflected in said second direction.

6. In a multichannel transmission system for microwave energy, a microwave hybrid branching filter comprising a first microwave hybrid structure and a second microwave hybrid structure, each of said structures having first and second pairs of conjugately related terminals, a pair of microwave transmission paths connecting said first pair of said conjugate terminals of the first hybrid structure to the first pair of conjugate terminals of the second hybrid structure, respectively, said paths effecting transmission of energy between said hybrid structures in a first portion of the channels of said system without change in the relative phase of the energy in said two paths, said paths reflecting energy and effecting a change of 180 degrees in the relative phase thereof of energy in said two paths in a second portion of said channels, means to apply microwave signals comprising energy in said first and second portions to one terminal of the second pair of conjugately related terminals of said first hybrid whereby substantially only the energy in said second portion appears in the other terminal in said last-named pair, and means to apply a second microwave signal comprising energy in at least said second portion to one terminal of the of the second pair of conjugately related terminals of said second hybrid whereby the energy of said second signal in said second portion appears in substantially only the other terminal of said last-named second pair.

WILLARD D. LEWIS.

REFERENCES CITED

The following references are of record in the file of this patent:

Article, "A Non-Reflecting Branching Filter for Microwaves," by Lewis and Tiltotson. Published in Bell System Technical Journal, vol. 27, Jan. 1948, pp. 83–95.